Aug. 25, 1925.

J. W. TURNER

SCOOP OR SHOVEL TOOTH

Filed Aug. 13, 1924

Inventor
J. W. TURNER,
By Monroe E. Miller
Attorney

Patented Aug. 25, 1925.

1,550,935

UNITED STATES PATENT OFFICE.

JAMES WALTER TURNER, OF BRAZIL, INDIANA.

SCOOP OR SHOVEL TOOTH.

Application filed August 13, 1924. Serial No. 731,816.

*To all whom it may concern:*

Be it known that I, JAMES W. TURNER, a citizen of the United States, residing at Brazil, in the county of Clay and State of Indiana, have invented certain new and useful Improvements in Scoop or Shovel Teeth, of which the following is a specification, reference being had therein to the accompanying drawing.

The present invention relates to teeth used for the scoops, shovels or dippers of excavators operated by steam or other power, it being the practice to secure teeth along the front edges of the scoops, shovels, and dippers for loosening the soil, and the present invention is particularly an improvement over the tooth disclosed in my Patent No. 876,111.

It is the object of the invention to provide a tooth of the kind indicated composed of a novel construction and assemblage of the component parts, whereby the tooth is strong in construction, and whereby the point can be reversed and the parts readily separated for repair or replacement.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1:
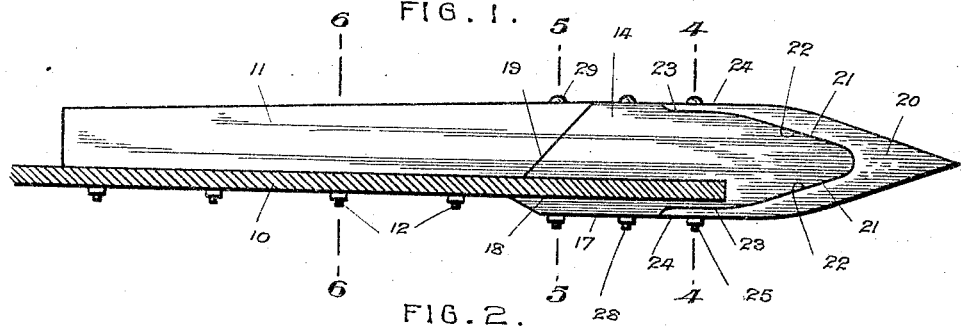
Figure 1 is a side elevation of the improved tooth.
Figure 2:
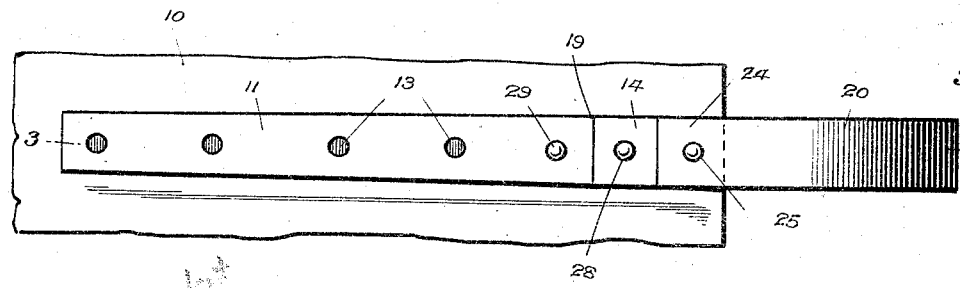
Fig. 2 is a plan view thereof.
Figure 3:
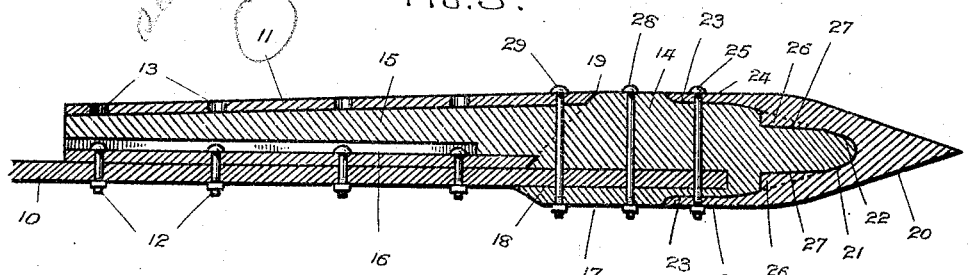
Fig. 3 is a longitudinal vertical section on the line 3—3 of Fig. 2.
Figures 4, 5, 6:
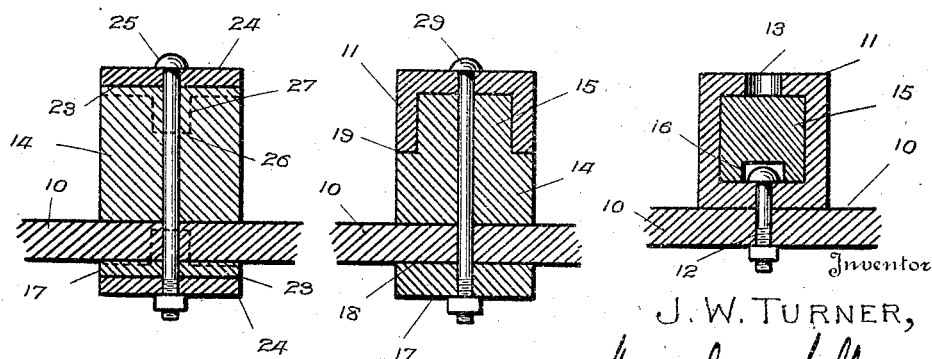

Figs. 4, 5 and 6 are cross sections on the respective lines 4—4, 5—5 and 6—6 of Fig. 1.

The teeth are secured to the forward edge portion of the scoop, shovel or dipper 10, and any number of teeth are used, only one of them being shown.

The tooth is composed of three parts which are made of suitable metal.

One part constitutes an elongated socket 11 of rectangular cross-section arranged at right angles with the edge of the shovel, and having its forward end spaced from said edge. The bottom of the socket 11 is secured by means of bolts or rivets 12 on the shovel 10, with the heads of said securing elements bearing on the bottom of the socket, the top of the socket having the openings 13 through which the securing elements can be inserted when fastening the socket to the shovel. The socket 11 tapers from its forward to its rear end.

The body 14 of the tooth is disposed in front of the socket and has a rearwardly extending tapered shank 15 of angular cross-section to fit snugly in the socket 11, and the shank 15 has a lower longitudinal groove 16 to accomodate the heads of the securing elements 12 when the shank is slid into the socket. The body 14 fits on the shovel 10 beyond the forward end of the socket, and said body has a rearwardly extending tongue 17 disposed below and bearing upwardly against the shovel 10, with a slot 18 to receive the forward edge portion of the shovel.

The forward end of the socket and rear end of the body 14 abut one another and are inclined forwardly, as at 19, whereby the rear end or inclined abutment of the body is fitted with a wedge fit between the shovel and forward inclined overhanging end of the socket, thereby assisting in holding the body on the shovel. Furthermore, rearward pressure on the body will have a tendency to force the rear end of the body, by cam action between the body and socket, down on the shovel.

The third part of the tooth comprises a reversible point or nose 20 which is of V-shape to fit astride the forward tapered end portion of the body 14. The point 20 has the inner converging surfaces 21 to fit snugly against the upper and lower converging surfaces 22 of the body 14, and the body 14 has the upper and lower parallel surfaces 23 beyond the surfaces 22 to receive the thin terminals 24 of the point 20. The terminals 24 are rounded off, and their outer sides are flush with the top and bottom surfaces of the body 14. The arms or branches of the point 20 have the inwardly extending lugs 26 to fit in recesses or notches 27 formed in the surfaces 22 of the body, whereby to prevent the point 20 being displaced transversely of the body. The upper and lower halves of the point 20 are alike, so that said point can be reversed by turning it upside down, thereby practically doubling the life of the point. The surfaces 23 and terminals 24 extend rearwardly beyond the edge of the shovel 10, and a single bolt or securing element 25 is used for fastening the point on the body. The securing element 25 extends vertically through the terminals 24 and body 14, thereby holding the point on the body, and the lugs 26 prevent the point from turning on the securing element 25 to one side or the other.

Additional bolts or securing elements 28 and 29 are used for fastening the body on the shovel. The bolt 28 extends through the body 14 and tongue 17 between the point and socket, while the securing element 29 extends vertically through the top of the socket and through the body and tongue so as to intersect the inclined plane of the abutting ends 19 of the body and socket. All three securing elements 25, 28 and 29 extend across the slot 18 so as to pass through the shovel 10. The securing element 29, when tightened, has a tendency to crush down the top of the socket at the forward end thereof against the inclined rear end of the body 14, and the pressure from all three securing elements springs the tongue 17 upwardly to tightly clamp the shovel 10.

Having thus described the invention, what is claimed as new is:—

1. A shovel tooth comprising a socket to be secured on a shovel and a body having a shank to fit in the socket, the body and socket having inclined ends to abut with the body having a wedge fit between the socket and shovel.

2. A shovel tooth comprising a socket to be secured on a shovel and having its forward end inclined forwardly, a body having forwardly inclined rear end to abut the forward end of the socket and having a shank to fit in the socket, and a securing element to extend through the top of the socket and the body.

In testimony whereof I hereunto affix my signature.

JAMES WALTER TURNER.